United States Patent [19]

Johansson

[11] Patent Number: 4,659,416
[45] Date of Patent: Apr. 21, 1987

[54] THERMAL BAR CODE PRINTER FOR LABEL APPLICATOR

[75] Inventor: Erik Johansson, Lund, Sweden

[73] Assignee: Ecupan AB, Staffanstorp, Sweden

[21] Appl. No.: 652,993

[22] Filed: Sep. 21, 1984

Related U.S. Application Data

[63] Continuation of Ser. No. 455,449, Jan. 4, 1983, abandoned.

[30] Foreign Application Priority Data

Jan. 7, 1982 [SE] Sweden .................................. 8200031

[51] Int. Cl.⁴ ............................................. B41J 3/20
[52] U.S. Cl. ................... 156/384; 400/103; 400/120; 346/76 PH
[58] Field of Search ............................. 400/120, 103; 346/76 PH; 219/216 PH; 156/384, 540

[56] References Cited

U.S. PATENT DOCUMENTS

| | | | |
|---|---|---|---|
| 3,496,333 | 2/1970 | Alexander et al. .................. | 219/216 |
| 3,577,137 | 5/1971 | Brennan, Jr. ....................... | 219/216 |
| 4,113,391 | 9/1978 | Minowa ............................... | 400/120 |
| 4,151,397 | 4/1979 | Boor, Jr. et al. ................... | 219/216 |
| 4,276,112 | 6/1981 | French et al. ...................... | 101/35 X |
| 4,386,360 | 5/1983 | Murayama et al. ............. | 346/76 PH |
| 4,389,935 | 6/1983 | Arai ................................. | 346/76 PH |
| 4,391,535 | 7/1983 | Palmer .............................. | 400/120 |
| 4,409,599 | 10/1983 | Yasuda et al. .................. | 346/76 PH |
| 4,415,904 | 11/1983 | Inui et al. ..................... | 346/76 PH X |
| 4,415,907 | 11/1983 | Suemori ......................... | 346/76 PH |
| 4,417,257 | 11/1983 | Mitsui ............................ | 346/76 PH |
| 4,422,376 | 12/1983 | Teraoka ............................. | 101/69 |

FOREIGN PATENT DOCUMENTS

| | | | |
|---|---|---|---|
| 50244 | 4/1977 | Japan ................................ | 400/120 |
| 32746 | 3/1978 | Japan ................................ | 400/120 |
| 04143 | 1/1979 | Japan ................................ | 400/120 |
| 36737 | 3/1979 | Japan ................................ | 400/120 |
| 141650 | 11/1979 | Japan ................................ | 400/120 |
| 39303 | 3/1980 | Japan ................................ | 400/120 |
| 24180 | 3/1981 | Japan ................................ | 400/120 |
| 38278 | 4/1981 | Japan ................................ | 400/120 |
| 49283 | 5/1981 | Japan ................................ | 400/120 |
| 53084 | 5/1981 | Japan ............................... | 346/76 PH |
| 136375 | 10/1981 | Japan ................................ | 400/120 |
| 01778 | 1/1982 | Japan ................................ | 400/120 |
| 150588 | 9/1982 | Japan ................................ | 400/120 |
| 205173 | 12/1982 | Japan ................................ | 400/120 |

*Primary Examiner*—Clifford D. Crowder
*Attorney, Agent, or Firm*—Ladas & Parry

[57] ABSTRACT

A label printer for a bar code comprising a heat printing head having resistance dots for printing the bar code on a heat sensitive label. A motor feeds the label with a constant speed, e.g. 10 cm/sec. The printing head receives electrical power pulses form a control unit which receives signals from a memory unit and a CPU-unit. The CPU-unit receives external signals form e.g. a weighing machine, a keyboard or an external computer and computes the bar code, check figures or the like. The printing head comprises a substrate including the electronic circuits and the resistance dots. The substrate is supported by a metal block which comprises temperature sensors which control the power pulses to the resistance dots.

5 Claims, 10 Drawing Figures

THERMAL BAR CODE PRINTER FOR LABEL APPLICATOR

This is a continuation of application Ser. No. 455,449, filed Jan. 4, 1983, now abandoned.

BACKGROUND OF THE INVENTION

The present invention relates to a label printer for printing a bar code.

In the retail business and also in the merchant firms, goods or articles are labelled with a bar code, such as EAN-code (or UPC-code), which stands for European Article Numbering. The code identifies the article and its origin. The code is composed of a plurality of bars having different width and spaces, which stand for or symbolize figures or digits, which also normally are printed adjacent the bar code, preferably below the same. The bar code is optically read, either by passing the parcel or article over a fixed optical reader or by passing an optical read pencil over the code. A computer tells the operator the price of the article and uses the information for statistical information on the stock, the stock content and so on.

At the labelling of goods packeted at the factory, the manufacturer (importer/exporter) provides the articles with the appropriate bar code which is unique for each article, whereupon the code follows the article during the whole handling thereof.

As to goods which are weighed and packeted on site, the code can define the price, the weight or the like. In this case e.g. five figures of the code are used for the price labelling, while the remaining figures as previously define the producer, the country or the like.

However, existing label printers for a bar code are comparatively slow. The object of the present invention is to provide a label printer capable of printing labels at a higher speed and with improved quality, and which can print the bar code and also further information on the label.

The label printer according to the invention is suitable for use at an electronic weighing machine, which weighs the goods and outputs the necessary information to the label printer. The weighing machine and the label printer can be arranged at a conveyor or at a manual weighing station.

Thus, there is a need of a fast label printer which can be connected to an electronic weighing machine at a conveyor or at a station. The label printer should also be able to be used in ordinary bar code labeling and thus be able to accept information from a keyboard or an external computer.

SUMMARY OF THE INVENTION

According to the invention there is provided a label printer for bar codes comprising a thermal printer head for printing on a heat-sensitive label. According to the invention the printer head comprises a plurality of resistance dots arranged close to the rim of a substrate, which in turn is supported by a metal block. The resistance dots are provided with power pulses in dependence of the information which is to be printed on the label. One or several temperature sensors are arranged in the metal block and control the pulse width of the power pulses in order to provide the resistance dots with the proper power supply at each instant.

The support and the metal block are divided into two or several units, which are separately adjustable with adjustment screws.

BRIEF DESCRIPTION OF THE DRAWINGS

Other objects and features of the present invention will appear more clearly from the following description of a preferred embodiment referring to the appended drawings, wherein.

DESCRIPTION OF PREFERRED EMBODIMENT

Figure 1:
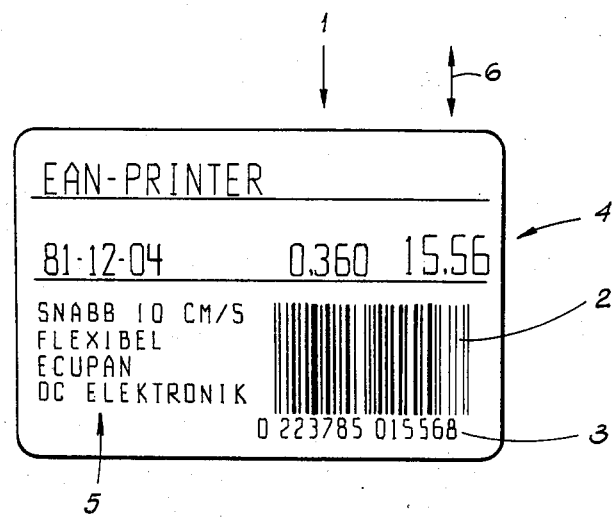
FIG. 1 is a plan view of a label printed by the printer of the invention.

In FIG. 1 there is shown a label printed by the label printer according to the invention. The label comprises a bar code 2 and figures or digits 3 therebelow. Moreover, the label comprises information on the article, e.g. the latest consumption date, comparison price (price per unit of weight), net weight and price, which information is printed in a separate preprinted or squared area 4. One of the squares is yellow in order to disclose the comparison price in accordance with specific rules for Sweden. Furthermore, the label can be provided with text 5 as required, e.g. for advertisement and/or for informing of the origin of the article. The label is printed by passing it by a printing head in the direction of the arrow 6. The printing head comprises a plurality of printing dots spaced along the width of the label. The printing dots are activated by means of suitable electronic circuits in order to colour the label. The label is of the heat-sensitive type and the printing dots are heating dots, as explained below in more detail.

Figure 2:
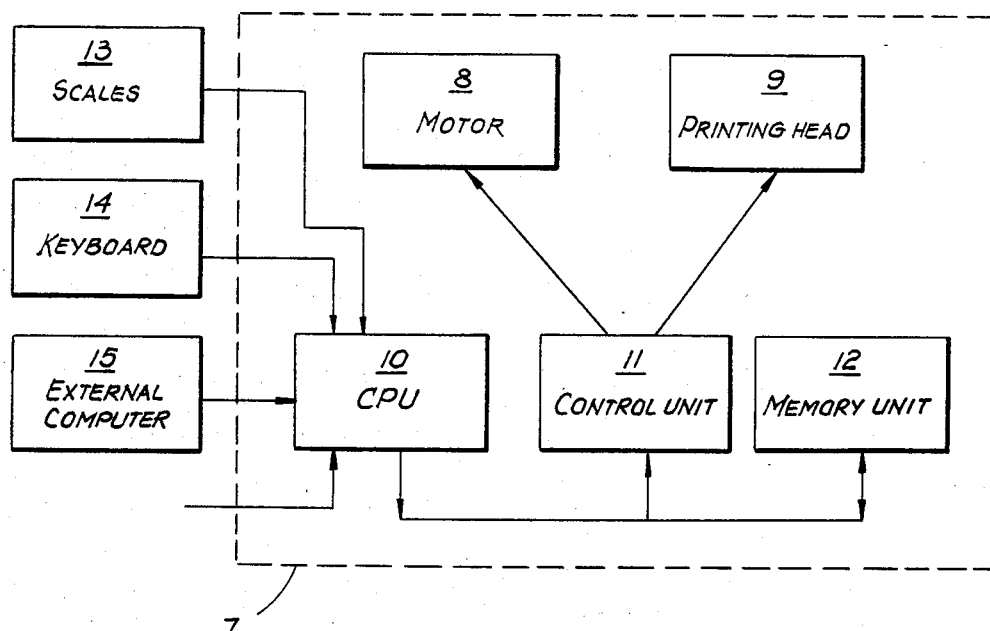
FIG. 2 is a block diagram of the printer system.

The construction of the label printer is evident from FIG. 2. The label printer comprises a driving motor 8 which feeds the labels, a printing head 9, a CPU-unit 10, a control unit 11 and a memory unit 12. The CPU 10 receives external signals in any suitable form, e.g. from a electronic scales 13, a keyboard 14 or from an external computer 15 and computes the bar code, check figures and the like, which are fed to the control unit 11, which also receives information from the memory unit 12. The control unit 11 feeds suitable control signals to the motor 8 and the printing head 9 and eventually to the remaining control units. The memory units stores fixed information to be printed on the label.

Figure 6:
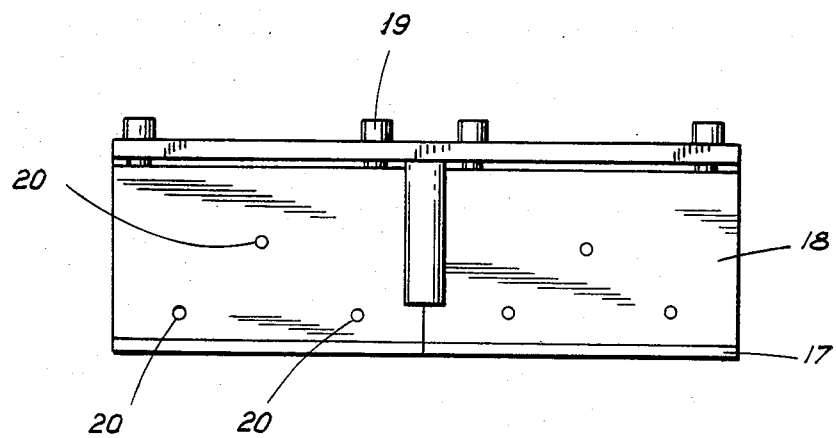
FIG. 6 is a side view of the printer head.
Figure 5:
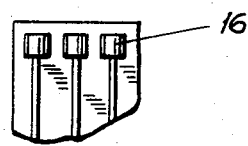
FIG. 5 is an enlarged plan view disclosing the individual resistance dots.
Figure 4:
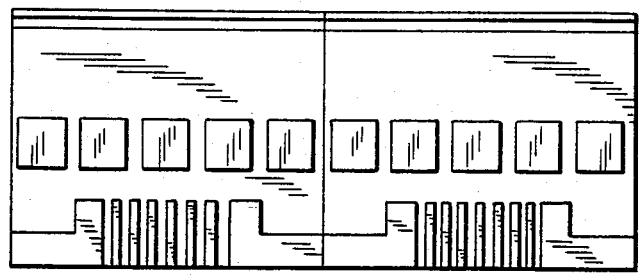
FIG. 4 is a plan view of the printer head.

The printing head comprises a plurality of resistance dots 16 arranged along one long side of the head as shown in FIGS. 4–6. The resistance dots are arranged on a thick film substrate positioned on a support 17. Moreover, the support comprises conductors, connection contacts and electronic circuits. The support is placed on a metal block 18. The support 17 is divided into two (or several) units positioned close to each other. Similarly, the metal block 18 is divided into two portions which are separately adjustable by means of adjustment screws 19, whereby the two rows of resistance dots 16 can be placed in line with each other. Preferably, the division line should be placed in such a way that it is not positioned in the bar code, which could give rise to disturbances and distorsion.

Figure 7:
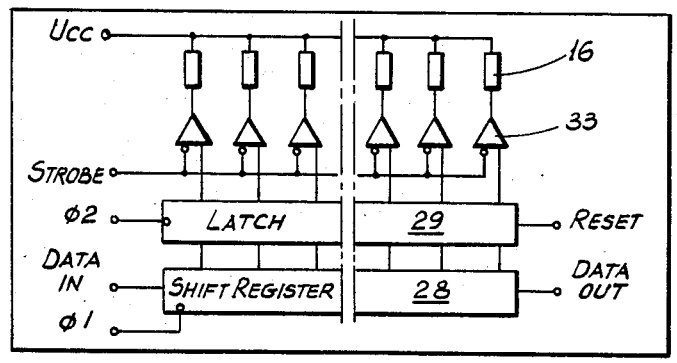
FIG. 7 is a circuit diagram of the printer head.

The electronic construction of the printing head appears from FIG. 7. The data is fed into a shift register 28 in serial form and is fed out in parallel form to a latch 29, which is set and reset in dependence of which resistance dots should be activated. From the latch 29 the signals are fed to each resistance dot through buffers 33, which are simultaneously controlled by a strobe-signal. The strobe-signal is composed of a series of pulses, whereby a plurality of power pulses are fed to the resistance dots from the buffers. In the next cycle new data is fed into the shift register 28 and the cycle is repeated. The pulse frequency is a few thousand Hertz, which means that there are several pulses for each dot to be generated or printed.

According to the invention, the pulse width of the power pulses is controlled so that the resistance dots always receive the correct power and temperature.

Figure 3:
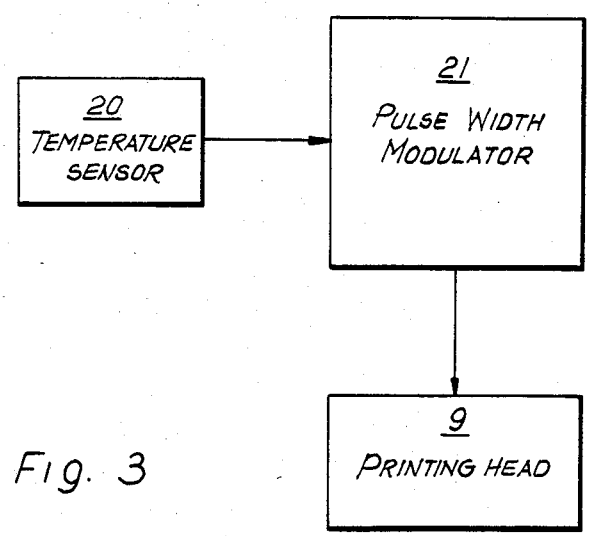
FIG. 3 is a block diagram of the temperature control.

The metal blocks 18 include one or several temperature sensors 20 positioned in suitable locations. The temperature sensors 20 are connected to a pulse width modulator (FIG. 3), which controls the pulse width of the strobe signal and thus the pulse width of the power pulses to the printing head. If several labels are printed in a series the power dissipated by the printing head will be high enough to heat the cooling block considerably. The power dissipated during the printing of the bar code can be as high as 300 W.

The colour of the dots printed on the paper is highly dependent on the temperature of the printing dot. In order to control the printing process it is necessary to control the temperature of the dots carefully and to provide an efficient heat sink. It is not sufficient with the heat conducted away by the substrate itself and the printing paper. The power dissipated is localized to discrete points or dots and the adjacent dot is cold. This generates very high temperature gradients, which can give rise to the effect, that the heat transfer to a "cold" dot is so high that it starts to colour the paper. Since the power dissipated is essentially proportional to the paper speed, this was not any problem with prior known and slower methods.

To solve this problem, the substrate is provided with heavy metal blocks, which are heat sinks and prevent the lines from agglomerating. Moreover, the pulse width is controlled electronically in order to provide a constant colouring. Those two measures combine and make it possible to triple the speed compared to previously known apparatuses. In industrial applications this high speed of about 10 cm/sec is required.

The metal blocks have a considerable heat capacity and a low thermal resistance. Thus, the heat energy dissipated at a single resistance dot is absorbed by the metal blocks and conducted and distributed over the whole area of the substrate. This effectively prevents any local heat build-up at any area of the substrate. The low thermal resistance of the metal block will counteract any temperature gradient within the metal blocks.

The metal blocks are initially heated to a temperature of about 40° C. by means of a suitable heating element and are maintained at this temperature by the heating element. During the continuous printing of the bar code a considerable power is dissipated which can heat the metal blocks to a higher temperature in spite of the large heat capacity of the metal blocks. However, the heat energy of the metal blocks is dissipated to the surroundings at such a rate that a safe temperature of the metal blocks always is maintained, e.g. below 60° C., at which temperature the het sensitive paper starts to colour. Thus, the metal blocks operate to integrate and equalize the temperature over the whole area of the substrate.

In the printing process, the temperature of each resistance dot should be raised sufficiently to colour the paper. Any excessive heat power supplied to each dot will heat the dot to a too high temperature, which slows the printing process. In accordance with the invention the temperature of the metal blocks is continuously monitored by means of one or several temperature sensors 20 positioned at suitable locations in the metal blocks. The temperature sensors control the pulse width of the power pulses supplied to the dots, so called pulse width modulation and hence the total power supply to the dots, so that the temperature of the dots always rises to the same value independently of the initial temperature of the metal blocks. Thus, any overheating of the dots is prevented, which speeds up the printing process.

Figure 8:
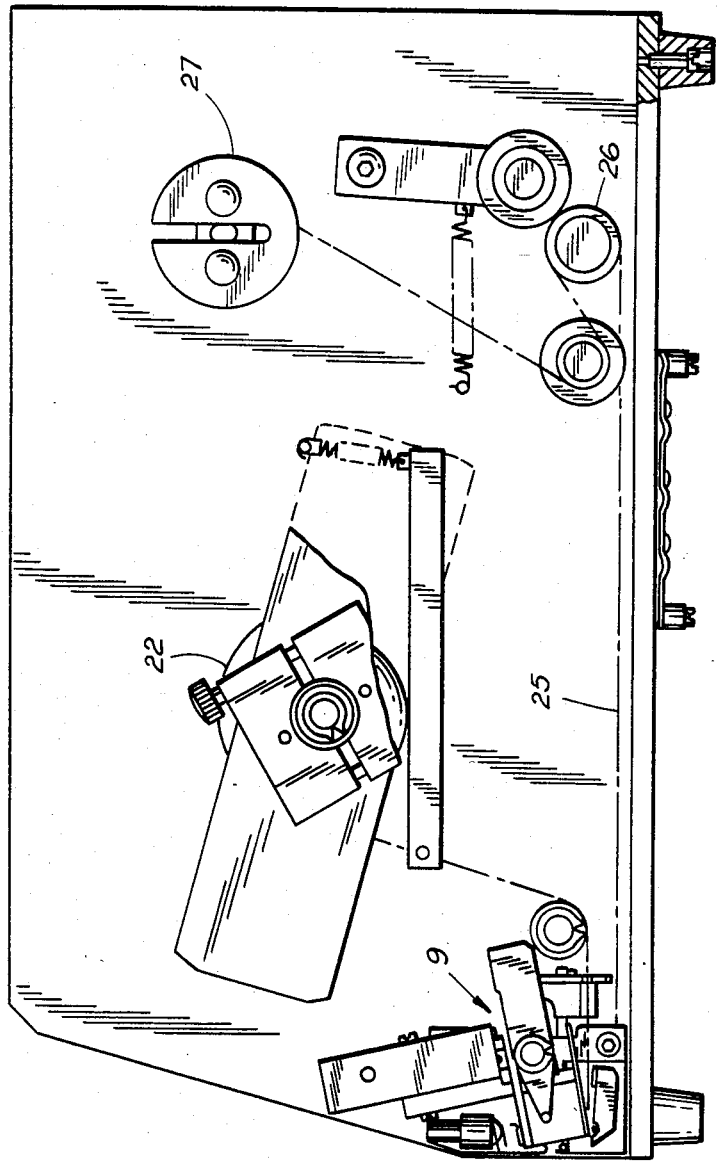
FIG. 8 is a side view of the mechanical construction of the printer.

In FIG. 8, the mechanical construction of the label printer is shown. From a supply of labels 22 the labels are fed over idling rollers to the printing head 9, whereupon the labels are printed. The supply of labels is provided with a suitable brake mechanism. The label backing 25 passes over a breaking edge, where the printed label is separated from the backing and the backing is fed over a driving roller 26 to a take-up roller 27 which is also driven. The driving roller 26 is connected to a step motor or the like which feeds the backing with a constant speed for the length of one label. The mechanical construction uses conventional components known per se and is not described in further detail, which is also true for the electronic circuits.

Figure 10:
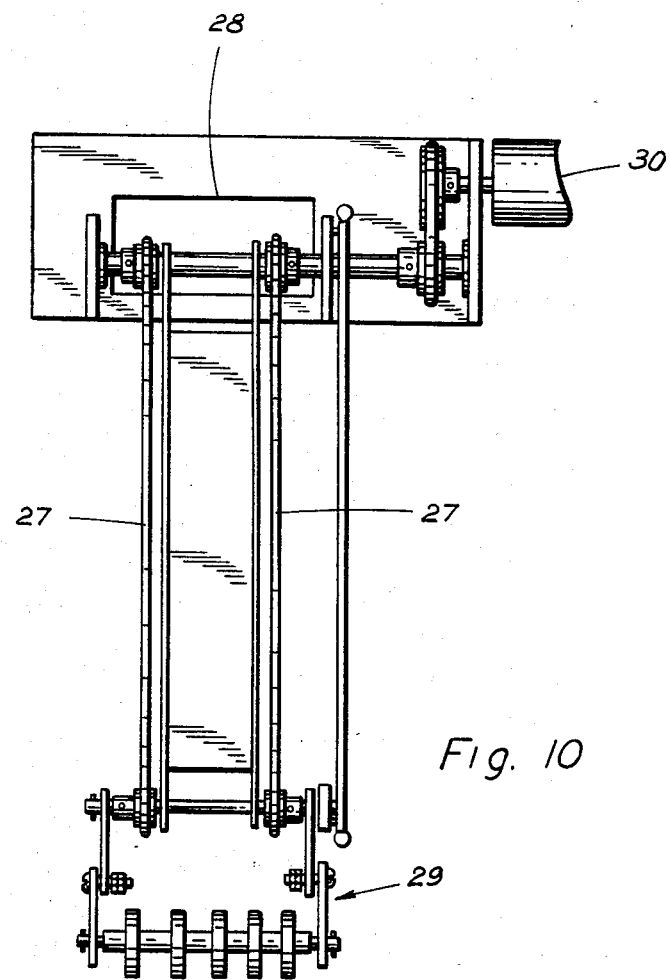
FIG. 10 is a plan view of the applicator.
Figure 9:
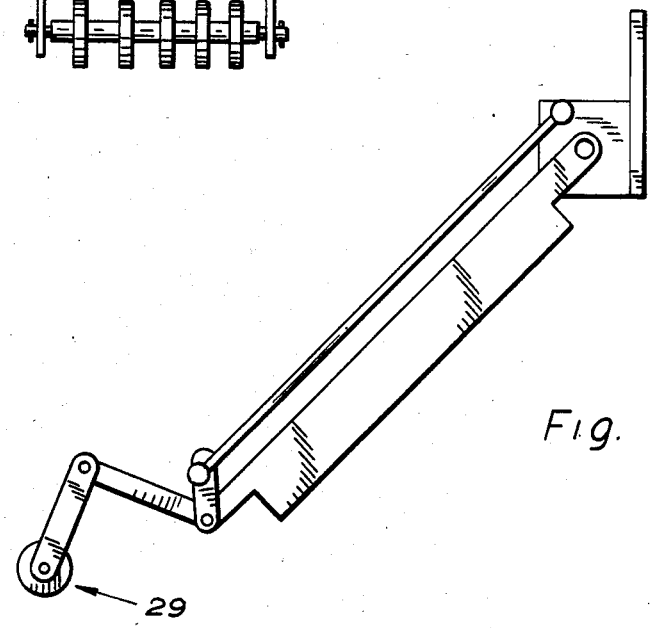
FIG. 9 is a side view of an applicator for applying the label to the article.

In FIGS. 9 and 10 there is shown an applicator for applying the label to a parcel passing below the printer. The applicator comprises two conveying belts 27 which are driven by a motor 30. The applicator is placed immediately outside the dispenser opening 28 of the printer so that the label is separated from the backing directly to the conveyor.

When the parcel which is to be provided with a label and is positioned on a conveyor, passes an optical sensor, the printing cycle is started and a label is produced and given off through the dispenser opening 28 to the belts 27, whereupon the label is transported down to the parcel which passes below the applicator in exactly the right moment to be provided with the label. A separate pressure member 29 attaches the label firmly to the parcel.

A preferred embodiment has been described above but it is realized that the details thereof can be modified in many respects within the scope of the invention. The invention is only limited by the appended claims.

I claim:

1. A label printer for printing a bar code and other information on a temperature sensitive paper by means of a printing head, comprising: an elongated, flat substrate having a first surface and a second surface; a plurality of resistance dots arranged on said second surface of said substrate; circuit means connected to said resistance dots, said circuit means supplying power pulses having a frequency of a few thousand Hertz to selected resistance dots to heat said resistance dots in accordance with the information to be printed on said temperature sensitive paper to print a label on said paper; a metal heat sink block having a surface in contact with said first surface of said substrate, said substrate being mounted in heat transmitting contact with said heat sink block; at least one temperature sensor for said heat sink block to control the pulse width of said power pulses to produce a printing dot or printing line on said temperature sensitive paper, several pulses being delivered to each resistance dot for printing a corresponding dot or line on said paper during the supply of power pulses oscillating the temperature of said resistance dot between a high temperature and a low temperature, both of which are above the minimum temperature for coloring said temperature sensitive paper.

2. A label printer as claimed in claim 1, wherein said temperature sensitive paper comprises a series of labels to be printed, said labels being adhesively supported on a backing for supply to the printing head.

3. A label printer as claimed in claim 1, further including: applicator means; and means for dispensing labels printed by said applicator means including at least two conveying belts for transporting the label to a parcel to be labelled.

4. A label printer as claimed in claim 3, wherein said temperature sensitive paper comprises a series of labels to be printed, said labels being adhesively supported on a backing for supply to the printing head; and means for separating printed labels from said backing for supply to said applicator means having an adhesive side of said labels contacting said conveying belts.

5. A label printer as claimed in claim 4, further including motor means driving said conveyor belts.

* * * * *